June 30, 1931.   R. NYGARD ET AL   1,812,708
HARROW
Filed Aug. 10, 1928   2 Sheets-Sheet 2
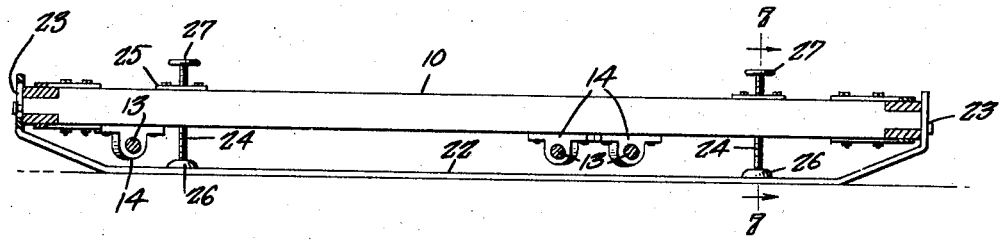
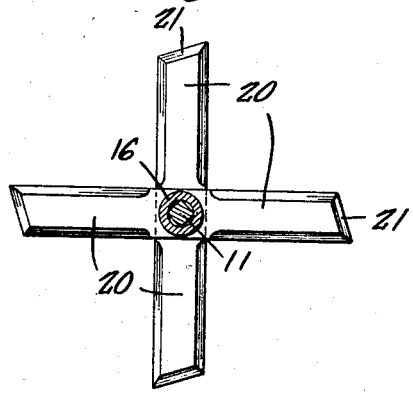
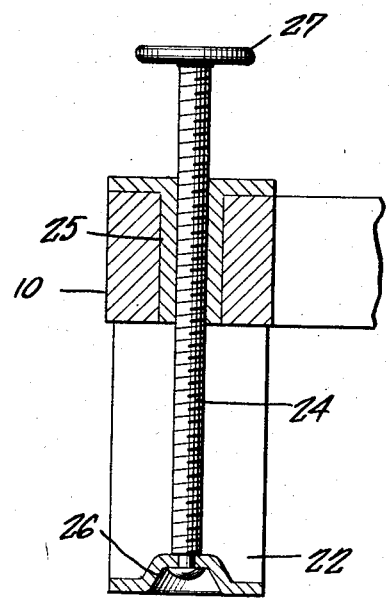
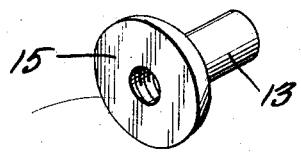
Rudolf Nygard,
Axel Finnila,
Torsten Lindell,
INVENTOR
BY Victor J. Evans
ATTORNEY Patented June 30, 1931

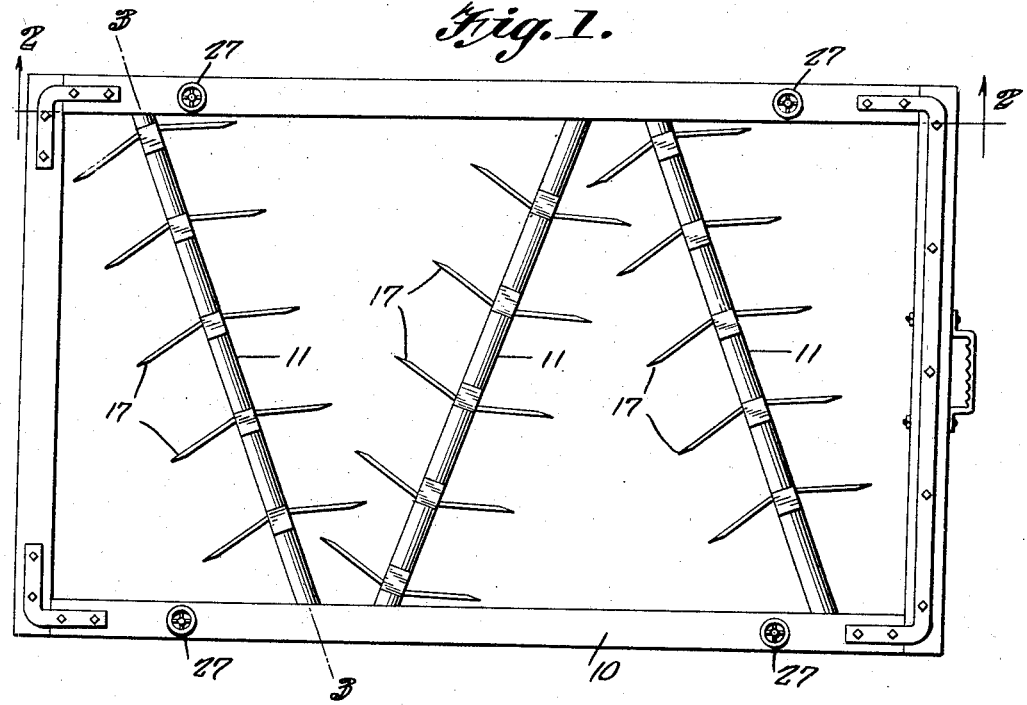
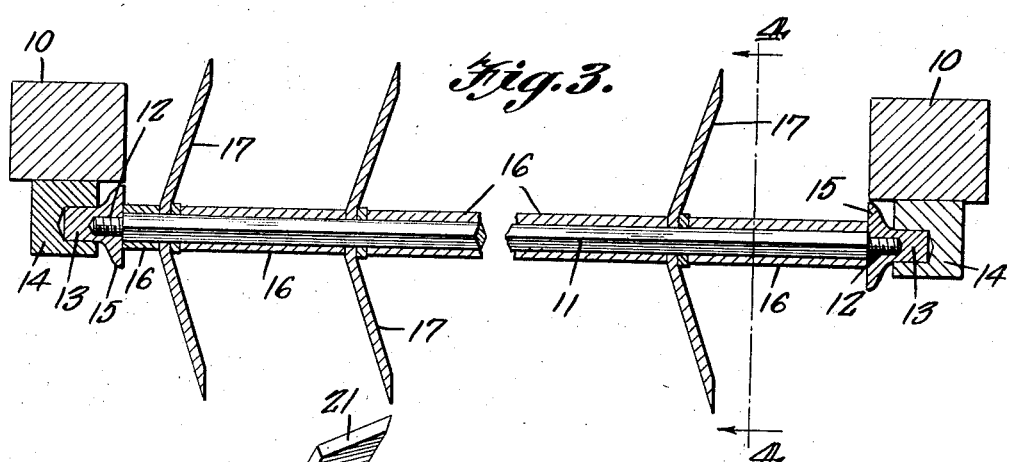
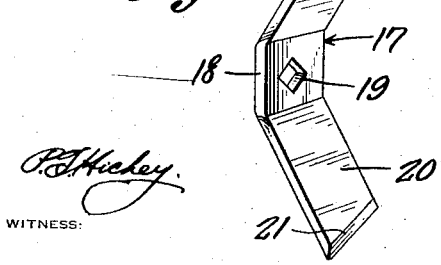

1,812,708

UNITED STATES PATENT OFFICE

RUDOLF NYGARD, AXEL FINNILA, AND TORSTEN LINDELL, OF SANDWICH, ONTARIO, CANADA

HARROW

Application filed August 10, 1928. Serial No. 298,729.

This invention relates to improvements in harrows and has for an object the provision of a novel form of harrow blade, together with means for mounting the same so that the blades will engage and penetrate the ground in a manner to effectually turn the ground over and properly prepare the ground without the necessity of going over the surface more than once, and thus save time and labor.

Another object of the invention is the provision of means for mounting the harrow frame so that the height of the latter may be adjusted and the depth of entry of the blades into the ground regulated.

With the above and other objects in view, the invention further includes the following novel features and details of construction, to be hereinafter more fully described, illustrated in the accompanying drawings and pointed out in the appended claim.

In the drawings:—

Figure 1 is a plan view of a harrow constructed in accordance with the invention.

Figure 2 is a longitudinal sectional view on the line 2—2 of Figure 1.

Figure 3 is a section on the line 3—3 of Figure 1 with parts broken away.

Figure 4 is a detail sectional view taken on the line 4—4 of Figure 3.

Figure 5 is a detail perspective view of one of the ground penetrating members.

Figure 6 is a detail perspective view of one of the shaft spindles.

Figure 7 is an enlarged detail sectional view on the line 7—7 of Figure 2.

Referring to the drawings in detail wherein like characters of reference denote corresponding parts, the reference character 10 indicates the frame of the harrow which may be made of either wood or metal as desired. This frame carries shafts 11 which are arranged at an angle with respect to one another and which extend at a transverse incline with respect to the center line of draft of the harrow. Each of the axles 11 is transversely rectangular with its opposite ends having reduced threaded portions 12. Mounted upon these threaded portions are spindles 13 which are mounted in bearings 14 secured to the under face of the side bars of the frame 10. The spindles 13 are provided with flanges 15 and these flanges bear against outer spacing sleeves 16 which are mounted upon the axles 11. The sleeves 16 serve to space apart ground penetrating members which are indicated generally at 17 in Figure 5 of the drawings. These members each include central portions 18 which have rectangular openings 19 therein to receive the shafts 11, so that the portions 18 are disposed at a right angle with respect to the shafts. Extending from the central portions 18 are relatively inclined blades 20 whose outer ends are inclined and beveled as shown at 21 so as to provide penetrating points to dig into the ground. The members 17 are arranged in pairs with the members of each pair disposed at right angles with respect to one another and the sleeve 16 engage and hold these members in proper spaced relation.

The members 17 are so arranged with respect to one another that due to their construction, they will dig into and effectually harrow the ground during a single passage of the harrow over the ground.

The frame 10 is supported upon runners 22 which extend beneath the side members of the frame and have their opposite ends adjustably secured to the frame as shown at 23. Extending through the side members of the frame are jack screws 24. These screws threadedly engage sleeves 25 carried by the frame and their lower ends are swiveled within inwardly extending socketed portions 26 provided in the runners. These runners are preferably formed of metal strips.

Mounted upon the upper ends of the jack screws 24 are hand wheels 27 by means of which the screws may be conveniently rotated.

The invention is susceptible of various changes in its form, proportions and minor details of construction and the right is herein reserved to make such changes as properly fall within the scope of the appended claim.

Having described the invention what is claimed is:—

A harrow disk gang comprising in combination with a frame, a shaft of rectangular formation in cross section and having reduced threaded extremities, spindles threaded on said extremities and journaled in said frame, spaced ground engaging elements mounted on the shaft for rotation therewith, each element comprising an elongated member of uniform width, and including an intermediate portion having a squared central opening to receive the shaft, and relatively inclined blades extending from the opposite ends of the intermediate portion in opposite directions and terminating to provide ground penetrating points, and said ground engaging elements being alternately arranged in right angular relation to each other throughout the length of the shaft, and spacing sleeves mounted on the shaft and arranged between the said ground engaging elements.

In testimony whereof we affix our signatures.

RUDOLF NYGARD.
AXEL FINNILA.
TORSTEN LINDELL.